Dec. 28, 1965  I. E. BRYANT  3,225,447
MICROMETER MEASURING DEVICE HAVING FEELERS
Filed Feb. 13, 1961  2 Sheets-Sheet 1
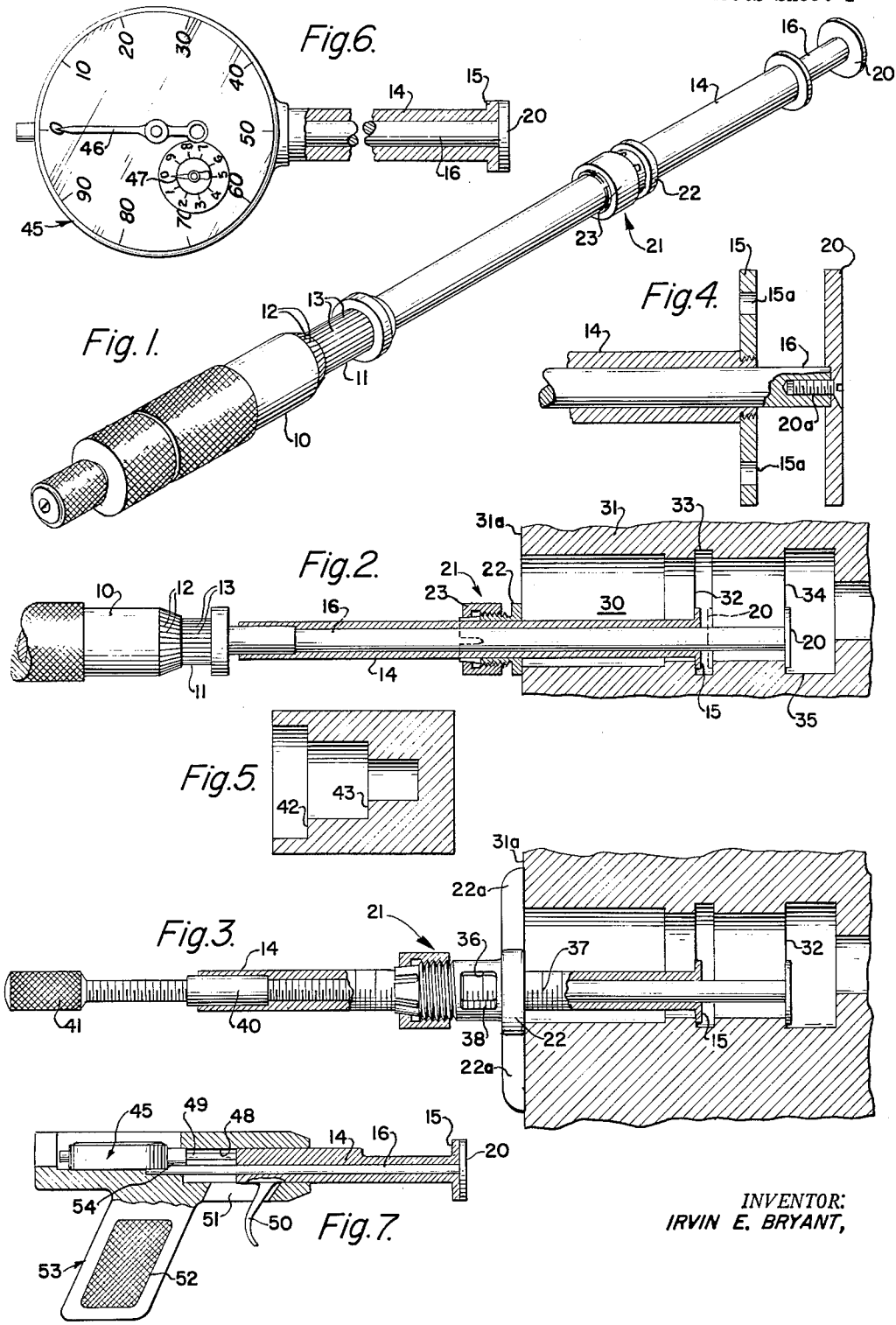
INVENTOR:
IRVIN E. BRYANT, Dec. 28, 1965   I. E. BRYANT   3,225,447
MICROMETER MEASURING DEVICE HAVING FEELERS
Filed Feb. 13, 1961   2 Sheets-Sheet 2
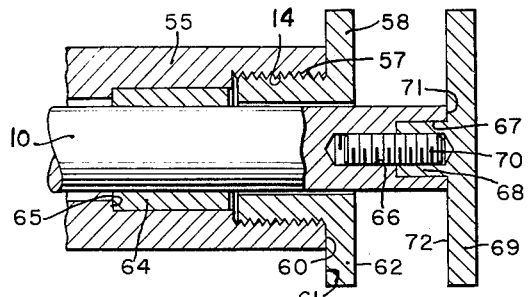
Fig.8.
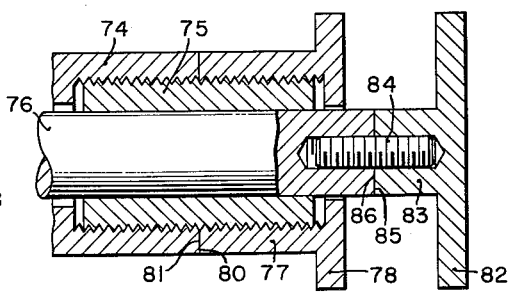
Fig.9.
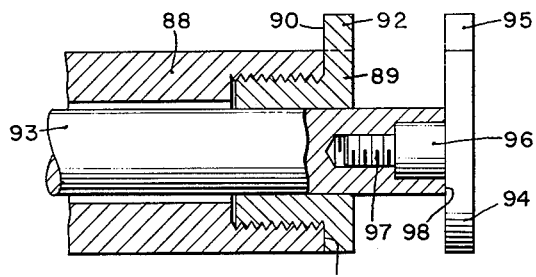
Fig.10.
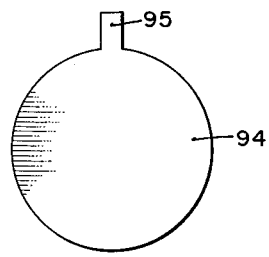
Fig.11.
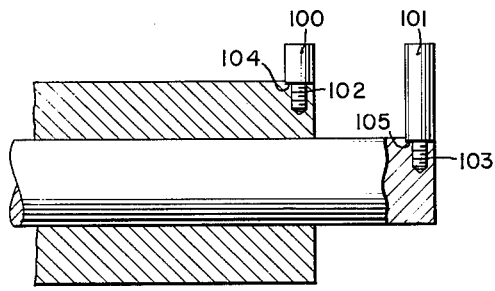
Fig.12.
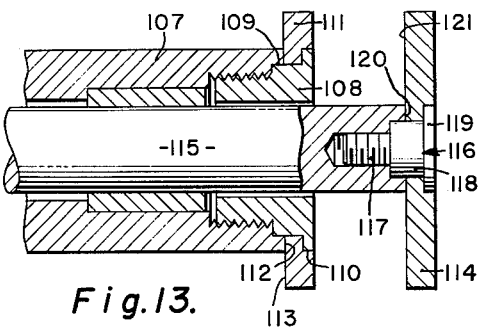
Fig.13.
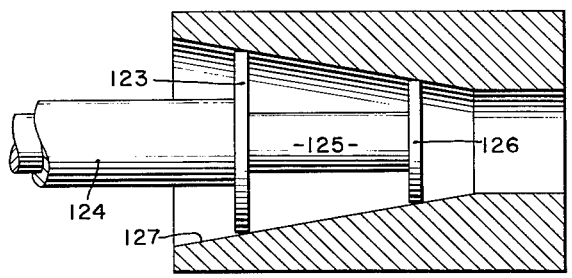
Fig.14.
INVENTOR.
IRVIN E. BRYANT
BY 
ATTORNEY.

United States Patent Office

3,225,447
Patented Dec. 28, 1965

3,225,447
MICROMETER MEASURING DEVICE
HAVING FEELERS
Irvin E. Bryant, Hawthorne, Calif., assignor to The Lufkin Rule Company, Saginaw, Mich., a corporation of Michigan
Filed Feb. 13, 1961, Ser. No. 89,060
2 Claims. (Cl. 33—143)

This application is a continuation in part of my copending application Serial No. 718,295, filed February 28, 1958, now abandoned, for Measuring Device.

This invention pertains to measuring instruments and more particularly to measuring instruments designed to measure the axial distance between the shoulders or the width of recesses formed on an internal bore.

In many machining operations it is necessary to measure the distance between shoulders or the width of grooves formed on the surface of a bore which is formed in a part. In the past these measurements have been obtained by very inaccurate means devised by persons responsible for forming the part. One of these means consists of using a probe which has a projection at one end and then scribing reference marks on the probe which indicate the axial distance to be measured. The distance between the reference marks is then measured with a scale after the probe is removed from the piece. It can be readily appreciated by those familiar with making precise measurements that this is a very inaccurate means of determining the axial distances between hidden shoulders or recesses.

This invention would solve the above problem of determining the axial distance between hidden shoulders by utilizing the thimble and sleeve of an ordinary micrometer and providing a pair of outwardly projecting flanges or feelers, one of which is attached to the movable spindle, the other of which is attached to an extension on the sleeve of the micrometer. The flanges or feelers are then positioned on each side of the recess or between the shoulders and an accurate measurement obtained by using the micrometer. The depth of a recess may be measured by bottoming the feeler or flange on the movable spindle in the recess and positioning the face of the feeler or flange on the sleeve against the outer face of the work piece, adjacent the recess opening. Further, a lockable slide on the sleeve having a vernier scale cooperating with a long scale on the sleeve can be used to obtain a reading of a recess depth or of a distance between shoulders in addition to and separate from the aforesaid micrometer reading. The thicknesses of the feelers can be predetermined so that various dimensions can be determined by adding or subtracting the thickness of the feelers as necessary. In addition, the feelers may be removably connected to the spindle and sleeve so that they may be removed and replaced at will in the event of damage or for use in measuring parts of various sizes. The taper of an opening may be determined with great accuracy when feeler discs of different diameters are used. Despite the versatility and economy afforded by the removable feelers, they are aligned precisely both concentrically and radially.

Accordingly, it is the principal object of this invention to provide an instrument capable of determining the distance between shoulders formed on the surface of a bore.

Another object of this instrument is to provide a novel micrometer type instrument which is capable of measuring the axial distance between two shoulders formed on the surface of a bore.

Still another object of this invention is to provide a unique micrometer type instrument which utilizes two outwardly projecing flanges of predetermined thickness to measure axial distances between projections formed on the surface of a bore, the flanges being positioned by a micrometer type instrument.

An additional object of this invention is to provide an instrument capable of measuring the taper of a convergent opening.

Further separate and combined objects of this invention are to provide an instrument of the character referred to in which parts are replaceable to permit substitution of parts of different size to adapt the instrument to measuring workpieces of differing configuration and which offers facilities for obtaining more than one measurement at a time from a workpiece.

These and other objects of this invention will be more easily understood by those skilled in the art to which it pertains from the following description of a preferred embodiment when taken in conjunction with the attached drawing in which:

FIG. 1 is a perspective view of the complete instrument,

FIG. 2 is a front elevation shown partly in section and illustrating the method of using the instrument, FIG. 3 shows a modification of the instrument of FIGS. 1 and 2, FIG. 4 fragmentarily illustrates in enlarged scale a detail of the instrument, FIG. 5 illustrates a characteristic workpiece which may be measured by this instrument, FIG. 6 illustrates a further modification of the instrument incorporating a dial indicator, FIG. 7 illustrates a preferred arrangement of a dial 10 indicator type of gauge, FIG. 8 is a fragmentary sectional view illustrating an arrangement for detachably mounting the feeler elements of the measuring device of this invention, FIG. 9 is a fragmentary sectional view similar to FIG. 8 showing a modified form of removable attachment and alignment for the feeler elements, FIG. 10 is another fragmentary sectional view of a modification in which the feeler elements project beyond the body of the instrument only at one radial position, FIG. 11 is an end elevational view of the arrangement of FIG. 10, FIG. 12 is a fragmentary sectional view of a further modification utilizing pins in place of the disc elements of the previously described embodiments, FIG. 13 is a fragmentary sectional view of removable measuring discs providing precise alignment concentrically and radially, and FIG. 14 is a fragmentary sectional view illustrating the measurement of the taper of a hole through the use of different sized discs on the instrument of this invention.

Referring now to the drawing, there is shown in FIGS. 1 and 2 an instrument having a thimble 10 and a sleeve 11 of an ordinary micrometer. Of course the thimble 10 should be provided with a threaded portion, preferable forty threads per inch, which threads into the hollow sleeve 11. The thimble should be provided with indicating marks 12 while the sleeve is provided with indicating marks 13 as found on conventional micrometers.

The sleeve 11 is fastened to a tubular frame member 14 by any desired means such as threads or welding. Of course, if desired, the sleeve 11 and tubular frame 14 can easily be made in one piece. The end of the tubular frame 14 is provided with an outwardly projecting flange or feeler 15 of predetermined thickness. While the feeler 15 may have any thickness, it simplifies use of the instrument if it is made an even dimension, for example, fifty-thousandths of an inch.

The thimble 10 is provided with an extension 16 which projects through the tubular frame 14 and extends beyond the end of the frame. The end of the extension 16 is provided with an outwardly projecting flange or feeler 20 of the same thickness as the feeler 16. Mounted on the outer surface of the frame is an adjustable stop 21 which consists of a split sleeve 22 and a lock nut 23 that threads onto the sleeve.

When the instrument is used in one application, it is positioned in a bore 30 formed in a member 31 as seen in FIG. 2. The feeler 15 is positioned so that it contacts the surface 32 of a groove 33 formed in the bore 30. The other feeler 20 is positioned on the groove 35 and the micrometer adjusted until the feeler 20 just contacts the surface 34. The reading of the micrometer, plus the thickness of the feeler 15, is then equal to the axial distance between the surfaces 32 and 34. The dotted position of the feeler 20 illustrates the means used to measure the width of the groove 33. In this case the thickness of both the feelers 15 and 20 would have to be added to the micrometer reading to give the width of the groove.

The adjustable stop 21 is used to determine distances from one end surface 31a of the member 31 to a surface 32, for instance, as shown in FIG. 2. When used in this manner, it is necessary to measure the distance between the stop 21 and the feeler 15 by some auxiliary means, such as an inside micrometer or the like.

Direct reading of the dimension between surfaces such as 31a and 32 may be obtained with an arrangement as shown in FIG. 3. In this arrangement the adjustable stop 21 is provided with an opening 36 therethrough exposing sleeve 14. A long graduated scale 37 is marked along sleeve 14 and is visible through slot 36. A vernier scale 38 is formed on a chamfered edge of slot 36 and cooperates with the scale 37. If desired, stop 21 may be keyed against rotation with the scales 37 and 38 operatively related. Since stop 21 may only rarely be required to be inserted in a bore or cavity, the facility of accurate use of the instrument may be improved by providing extensions 22a on flange 22 to help orient the instrument with respect to the workpiece.

FIG. 3 shows the instrument without a micrometer for reading spindle settings. Instead the spindle 16 is now threaded and threads through a bushing 40 secured in sleeve 14. A knurled thumb nut 41 facilitates rotation.

FIG. 4 illustrates arrangements affording detachment and replacement of feelers 15 and 20 on sleeve 14 and spindle 16, respectively. This feature is advantageous where internal stepped recesses are encountered. Feeler 15 is threaded over the end of sleeve 14 and securely seated against a shoulder. Holes 15a in the feeler may be provided to receive a spanner wrench for removing and tightening the feeler. Alternatively, a screw 20a may be employed to secure feeler 20 to the end of spindle 16.

To measure the distance between surfaces 42 and 43 in FIG. 5 feeler 15 may be replaced with a larger diameter feeler to permit maintaining the axis of the instrument normal to the faces being contacted.

FIG. 6 shows the application of a dial indicator micrometer 45 of conventional type to the spindle-sleeve assembly. Axial displacement of spindle 16 in sleeve 14 drives a rack and pinion (not shown) internally of indicator 45. This pinion drives pointer 46. A second pointer 47 geared to the drive for pointer 46 rotates once for each ten revolutions. The scale at the small pointer is calibrated in tenths of inches and the large dial has 100 scale divisions which provides a least count of one-one thousandths of an inch for the drive relationship.

The assembly shown in FIG. 7 incorporates the dial indicator gauge 45 in a pistol grip mount 53. In this arrangement spindle 16 is stationarily secured in mount 53 at 54. Sleeve 14 is slidably mounted for axial displacement along spindle 16 and to this end is slidably fitted within a bore 48 in mount 53. Dial indicator spindle 49 engages the end of sleeve 14 within bore 48 and is spring loaded in this position by springs (not shown) within the indicator. When trigger 50, secured to the bottom of sleeve 14 and projecting through slot 51 in mount 53, is pulled toward grip 52, sleeve 14 displaces the dial indicator spindle 49 producing a corresponding indication on the dial. This instrument may be applied in the manner described hereinabove.

As mentioned above, the measuring device of this invention may be constructed so that the feeler units are readily detachable and can be replaced as desired. This is important in the event that it is desired to utilize feeler units of various dimensions depending upon the size of the part, or where stepped internal recesses are to be measured. Furthermore, if the end discs are readily replaceable any damage or wear on these members does not require major overhaul of the instrument, but may be taken care of by the minor operation of substituting end members. Also, as will be made more clear hereinafter, replaceable feeler elements at the end of the instrument of this invention permits its use in measuring tapered openings in a manner heretofore impossible.

In each instance it not only is important to be able to replace the feeler elements of the instrument, but is also essential that proper alignment and concentricity be maintained so that a proper reading will result for any measurement taken. Screw threads invariably involve clearances, and are difficult to form with a high degree of precision, so threaded connections should not be relied upon to supply the alignment for the removable parts.

One particularly suitable arrangement for securing the feeler elements of the instrument shown in FIGURE 1 may be seen by reference to FIG. 8. Here, instead of including an integrally formed feeler element thereon, an internally threaded portion 56 is included in the tubular frame 14. This receives and engages the axially extending threaded portion 57 of the feeler element 58. By closely controlling the formation of the end face 60 of the frame 14, and radial faces 61 and 62 of the disc element 58, proper alignment of the disc can be obtained. Thus, regardless of any minor imperfection in the threaded connection between the portions 56 and 57 of the mating members, the disc can be brought into precise radial alignment when the inner radial face 61 is brought into abutment with the end radial face 60 of the frame 14. With the outer face 62 of element 58 being made parallel to the inner radial face 61, a properly aligned and proportioned feeler element is obtained.

The spindle 10 passes through a bushing 64 that engages an internal shoulder 65 on the frame element 14. It may be noted that the end disc 58 of the outer assembly does not bear directly against the spindle 10 which is made concentric with the frame 14 by means of the bearing 64 rather than the end disc. The outer end of spindle 10 includes a tapped hole 66 at its axis, circumscribed in part by a shallower but larger diameter opening 67. The latter opening receives a hub portion 68 of an end disc element 69. This hub includes a tapped axial hole receiving a stud 70 which engages the opening 66 in the end of member 10, attaching the member 69 thereto. Alignment of the end feeler element 69 is attained by means of the radial end wall 71 of the spindle 10 engaging the inner radial face 72 of the disc element, as well as the contact of the hub portion 68 of the end disc with the opening 67 in the spindle. The hub in recess 67 also makes the disc 69 concentric with spindle 10.

It is apparent, therefore, that according to this arrangement both of the end discs are readily removable, yet are maintained in perfect radial alignment by the interengagement of the precision-formed radial faces. In no event is it necessary to achieve such alignment by means of a screw threaded surface.

A modification of the replaceable feeler elements of the invention may be seen by reference to FIG. 9 in which the end portion 74 of frame 14 is provided with an internal threaded opening that receives a sleeve 75, the inner surface of which acts as a bearing for the spindle 76 corresponding to spindle 10. The sleeve 75 also threadably engages hub portion 77 of the feeler element 78. This disc portion is radially aligned by means of the contact between outer end face 80 of the frame end portion 74 and the inner radial face 81 of the hub 77 of the feeler element.

Measuring element 82, connected with the spindle 76, includes a hub 83 joined by means of stud 84 with the end of the spindle. Radial alignment of the end disc is secured by interengagement of the end face 85 of the spindle, and the radial face 86 of the hub 83. Again, therefore, precision alignment is secured without relying upon the contact between threaded members.

In order to assure that the end disc 82 is concentric with the axis of the spindle 76, it is preferred to retract the latter element within sleeve 75 prior to attachment of the element 82. Thus, when the element 82 is secured to the end of the spindle, the hub 84 of this member is received within the relatively long bearing member 75 along with the end of the spindle. The bearing causes the spindle and disc 82 to assume a concentric relationship.

FIGS. 10 and 11 illustrate a further embodiment of the invention which is particularly adapted for the modifications in which the movable spindle does not rotate relative to the frame extension, such as in the arrangements of FIGS. 6 and 7. The design of FIGS. 10 and 11 may be used to advantage where the bore in the element to be measured is of a minimum size and it is not feasible to insert an element therein which is projecting on all sides from the frame extension.

The construction of this arrangement includes an inwardly threaded portion on the end portion 88 of frame 14 somewhat similar to the portion 56 in the embodiment of FIG. 8. As illustrated in FIG. 10, however, no additional bearing is included, although this may be supplied in the design of FIG. 10 if desired. The end disc 89 threadably engages the interior of the end portion 88, and the inner radial wall 90 of this end disc thereby becomes radially aligned with the end wall 91 of the end portion 88. Instead of being in the form of a projecting flange extending around the entire periphery of the end portion 88, however, the element 89 includes only the small projecting element 92 at one radial position thereof.

The movable spindle 93 corresponding to spindle 10 carries a measuring element 94 having essentially the same overall contour as the member 89. Thus element 94 includes only the small radial projection 95, rather than the larger circumferential disc as in the previously described embodiments. The member 94 is secured to the end of spindle 93 similarly to the connection of feeler element 69 of FIG. 8. A hub portion 96 is located at one side of member 94 from which stud 97 projects to engage an axial tapped opening in end of the spindle 93. Thus, alignment is obtained at the radial end wall 98 of the spindle, as well as along the circumferential wall where the hub 96 contacts the recess within the end of the spindle for engaging this member. Again, therefore, regardless of the ability to remove and replace the discs at will, precise alignment is secured.

A particularly simple arrangement for obtaining measurements is illustrated in FIG. 12 where again the device may include a projection only at one radial surface. Here, rather than the discs as in the previously described arrangements, pins 100 and 101 provide the measuring means. These pins may include smaller stud portions 102 and 103 at their inner ends for contacting corresponding radial tapped openings in the housing and movable spindle, which latter elements may be spot faced to provide a good contacting surface for the bottom faces 104 and 105 of the pins. Measurement may be obtained either between the adjacent faces of the pins or by utilizing their opposite surfaces, as in the previous embodiments.

Particularly accurate alignment both radially and concentrically is secured by the arrangement shown in FIG. 13. Here the end portion 107 of frame 14 threadably receives a nut element 108 which includes both shoulders 109 and 110. Installation is facilitated by suitable driving recesses (not shown) in the outer face of the nut 108. The smaller diameter portion 109 is received within a complementary recess in the end of the end portion 107, while shoulder 110 contacts a corresponding surface in the disc element 111. The latter element also bears on the hub 109 of the nut 108. Thus, when the nut element 108 is threadably engaged with the end of the end portion 107, the shoulders 109 and 110 perfectly align the measuring disc 111 concentrically with the axis of the instrument. At the same time, the radial end face 112 of the housing extension, and the inner radial wall 113 of the measuring disc, provide precise radial alignment of the disc 111.

The other measuring element 114 similarly is given a precise alignment with respect to the spindle 115 corresponding to spindle 10. A nut element 116 includes a stud portion 117 threadably received in the end of the spindle, while a shoulder 118 engages complementary surfaces in the end of the spindle and in the inner portion of the measuring disc as well. The head 119 of the nut 116 also can assist in positioning the element 114 to a concentric relationship with the spindle. Thus, with the radial alignment afforded by the end face 120 of the spindle, and the inner radial face 121 of the outer measuring disc, radial as well as concentric alignment is achieved.

The arrangement of FIG. 13 is particularly desirable when measuring the taper of a hole in the manner illustrated in FIG. 14. This may be accomplished by providing a disc 123 of a relatively large diameter on the end of the end portion 124 of frame 14, while the spindle 125 corresponding to spindle 10 carries a smaller disc 126. If both of these discs are precisely aligned, both with respect to the axis of the instrument and with their radial positions, an exact indication of the taper of opening 127 may be obtained. This is secured by simple mathematics from the micrometer reading that gives the spacing between the outer edges of the discs 123 and 126 when the edges of both of these elements are brought into engagement with the surface of opening 127. With the diameters of the discs being known, it is a simple matter to compute the exact amount of taper in opening 127 from the reading indicated by the instrument.

Preferably in obtaining the taper of an opening, the instrument is constructed so that the spindle does not rotate, as in the versions of FIGS. 6 and 7. This assures that there is no relative rotation between the surface of the opening and the measuring discs, avoiding undue wear or damage to either. The instrument is particularly versatile in that discs of any desired diameters may be attached to accommodate openings of different diameters and tapers.

From the foregoing, therefore, it is apparent that I have provided an improved measuring device that is particularly adapted for securing internal dimensions of an object to be measured. Furthermore, the inclusion of the removable discs on the ends of the housing and the movable spindle assure both proper alignment and simple repalcement of parts as required.

I claim:

1. A measuring instrument comprising a spindle, a first laterally outwardly projecting feeler of predetermined thickness, said spindle having a threaded concentric axial bore, threaded means connecting with said feeler received in said bore and removably connecting said first feeler to the front end of said spindle, said spindle having a radial feeler confronting face and said first feeler having a hub portion, and said feeler including a radial face engaging and aligning with said confronting face, a tubular frame, a second outwardly projecting feeler of predetermined thickness on the front end thereof, means removably connecting said second feeler to one end of said tubular frame, said spindle projecting through said tubular frame with said first and second feelers juxtaposed, means for relatively axially moving said spindle and said tubular frame, and means for indicating the relative positions of said spindle and tubular frame.

2. A device as recited in claim 1 wherein the tubular frame has an internal bore of enlarged diameter receiving a bearing near the front end portion of said tubular frame to slidably support said spindle therein, there being a further enlarged threaded internal bore extending from said bore to the front of the frame and said second feeler having a threaded hub received in said threaded bore, there being confronting radial faces on said second feeler and frame.

References Cited by the Examiner

UNITED STATES PATENTS

| | | | |
|---|---|---|---|
| 561,802 | 6/1896 | Markham | 33—166 |
| 620,337 | 2/1899 | Lavigne | 33—164 |
| 2,405,648 | 8/1946 | Gray | 33—174 |
| 2,454,246 | 11/1948 | Worthen | 33—147 X |
| 2,516,478 | 7/1950 | Mueller | 33—167 |
| 2,642,670 | 6/1953 | Dow | 33—174 |
| 2,643,459 | 6/1953 | Beers et al. | 33—169 X |
| 2,788,582 | 4/1957 | Middeler | 33—174 |
| 2,828,547 | 4/1958 | Campbell | 33—143 |
| 2,843,938 | 7/1958 | Campbell. | |

FOREIGN PATENTS

| | | |
|---|---|---|
| 738,779 | 10/1932 | France. |
| 9,259 | 1892 | Great Britain. |

ISAAC LISANN, *Primary Examiner.*